Sept. 27, 1932.   A. BEURDELEY   1,879,048
VEHICLE SUSPENSION SPRING
Filed April 6, 1931
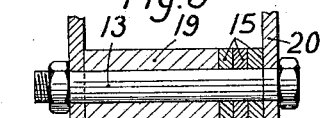
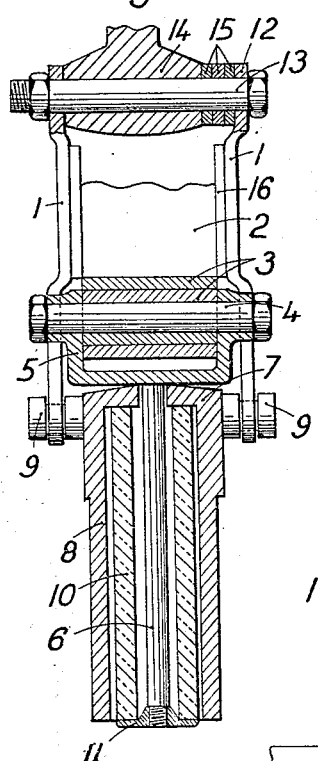
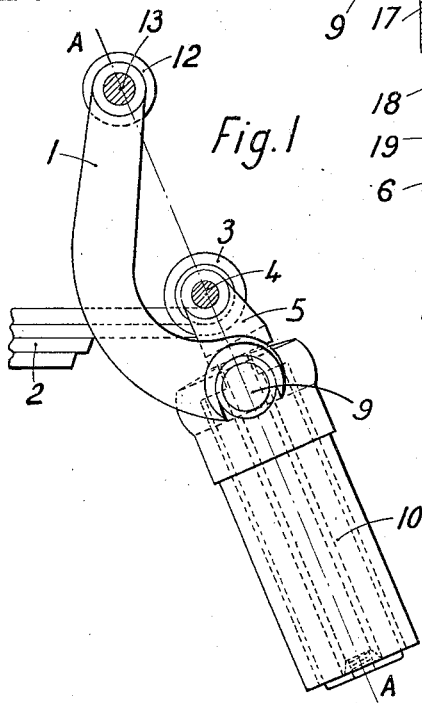
A. Beurdeley
INVENTOR
By Marks &Clerk
ATTYS.

Patented Sept. 27, 1932

1,879,048

UNITED STATES PATENT OFFICE

ANDRÉ BEURDELEY, OF PARIS, FRANCE

VEHICLE SUSPENSION SPRING

Application filed April 6, 1931, Serial No. 528,146, and in France April 15, 1930.

The present invention relates to improvements in vehicle suspension springs.

These improvements consist in the interposition of an elastic device between the vehicle frame and its spring, thus forming an elastic shackle or elastic bracket, and hence adding an elastic connection to the elastic device which consists of the usual plate spring, whereby the said spring will be given a greater freedom of motion than can be obtained in the known arrangement of rigid shackles.

The said elastic arrangement may consist of solid pieces, solid or hollow cylinders or rubber washers, optionally reinforced, or of metal springs.

The following description with reference to the accompanying drawings relates to various embodiments of the invention.

Fig. 1 is a side elevational view of a device according to the invention.

Fig. 2 is a section on the line A—A of Fig. 1.

Fig. 3 is a section view, analogous to Fig. 2, of a modified construction.

In the form of construction shown in Figures 1 and 2, the shackle itself consists of two parallel plates 1 between which is slidable a suspension spring 2, said plates being cross-connected where necessary. The eye portion 3 is wound about the pivot bolt 4 of a forked member 5 which constitutes a spacing block for the lower ends of the side plates 1 and is provided with a round rod 6 which is screw-threaded at the lower part and is slidable according to the axis of the head 7 of the cylinder 8, which head carries two journals 9 by which it is pivotably mounted on the lower ends of the respective plates 1. An elastic device 10 consisting of rubber and subject to compression stress is interposed between the end of the cylinder 8 and a screwthreaded disk 11 which is screwed to the lower end of the rod 7.

The said plates 1 have the form of a curve whose concave part faces the end of the spring 2, thus laterally maintaining the spring 2 at a point situated between its center and its end, that is, at a point at which the spring has a greater thickness than at the end, so that it is held more strongly and the spring plates will not be distorted. The upper ends of the plates 1 extend somewhat to the exterior, and they are provided with a head 12 traversed by a bolt 13; said bolt connects the shackle with a supporting bracket 14 which is mounted on the vehicle frame and which parts constitute the main cross connection between the upper ends of the side plates 1. The plates 1 are thus extended in order to remedy any possible faulty mounting of the spring, and chiefly when the latter is not straight with reference to the bracket 14. Due to this extended part, the shackle may be laterally displaced on the bolt 13, interposing any necessary spacing members or washers 15 between the inner sides of the shackle and the bracket 14, until there is obtained an exactly straight mounting between the bracket of the vehicle frame and the eye of the spring in the lateral direction, and also for the purpose of preventing one of the lateral edges of the plate spring from being too readily pressed against the corresponding inner side of the plate 1.

The operation of the said device is as follows:

The elastic combination is held between the disk 11 and the inner end of the head 7 of the cylinder 8. The position of equilibrium of the device is the one corresponding to the alignment of the three axes 13, 4 and 9, representing the joint between the shackles and the vehicle frame, the joint of the spring, and the joint between the cylinder and the shackle plates. In virtue of this disposition, and under the effect of the irregularities of the ground, the spring 2 will have a greater freedom of motion, since in addition to its vertical motion within the shackle, it has also a lengthwise motion on account of the pivoting of the cylinder on the shackle plates by means of its journals. This affords a better use of the spring, which is added to the flexibility of the device in order to provide a much improved spring suspension.

The arrangement of the shackle plates on the outside of the springs prevents all distortion of the spring plates and the spring is more rigid in the lateral direction by reason of the greater number of spring plates now operating. On the other hand, the vehicle spring has more freedom of motion, as its end is subject to straight motion and also to rotation, whereas the ordinary shackle will only allow it to rotate about the axis of the vehicle frame. The movements of the tube 10 have the effect, under the action of jolting, of pivoting the elastic device about the bolt 13, and this pivoting is impeded by the contact between the edges of the spring plates 2 and the inner sides of the shackle plates 1. It is advisable to employ plates of antifriction metal 16 as a covering for the inner sides of the said shackle plates 1, as shown in Fig. 2.

In the arrangement shown in Fig. 3, the elastic rubber member 10 is replaced by helical springs, three in number for instance, 17, 18 and 19; said springs have decreasing lengths, and thus when the disk 11 comes nearer the inner end of the top part 7 of the cylinder 8, the spring 17 will at once commence to act, and the other two springs act in succession, starting from a certain displacement of the rod 6 in the cylinder 8. Due to this arrangement, the action of the spring suspension will be independent of the load on the vehicle.

In the apparatus shown in this Fig. 3, it is further supposed that the shackle plates 1 are not spaced apart but have the contrary disposition and are joined to a bracket 19 traversed by a bolt 13 which also passes through side plates 20, secured to the vehicle frame; said bracket 19 is shorter than the space between the said plates 20, and thus the position of the bracket upon the bolt 13 can be adjusted by means of washers 15 which serve exactly the same purpose as in the case of Fig. 2.

It is evident to all persons skilled in the art that the aforesaid apparatus can be suitably modified in detail without departing from the spirit of the invention, and that the forms of construction herein described and represented are not of a limitative nature.

Thus for instance the arrangement for connecting the main shackle with the vehicle frame, and the form of its upper end, may be of such nature that it will be adapted for all constructions of vehicle frames, or to all methods of attaching the parts.

I claim:

1. A suspension device mounted between a vehicle spring and a vehicle frame, comprising two parallel side plates pivotably mounted at their upper ends upon the vehicle frame, a forked member pivoted to the end of the spring, a cylinder beneath the forked member and to which the lower ends of the plates are pivoted, a plunger movable in the cylinder and fixed to the forked member, and an elastic device contained in the cylinder and subject to compression stress and interposed between the upper end of the cylinder and the plunger.

2. A device as claimed in claim 1, wherein the said side plates have a curved outline whose concave part faces the end of the vehicle spring, whereby the said plates will maintain the said spring laterally between its center and its outer end at a point at which the plate spring comprises a sufficient number of plates to prevent all distortion of the spring.

3. A device as claimed in claim 1, wherein the said side plates are extended at their upper ends in such manner as to allow a clearance between them and the part which is secured to the vehicle frame upon which they are mounted, and washers inserted in the connection between the plates and vehicle frame for correcting all defects in the mounting as concerns the relative position of the said suspension spring and the part of the vehicle frame to which the said spring is attached.

4. A device as claimed in claim 1, wherein anti-friction metal plates are arranged at the inner sides of said side plates for providing for the proper friction of the vehicle spring against the aforesaid side plates.

5. A device as claimed in claim 1, wherein the elastic arrangement consists of a plurality of concentric helical springs of different lengths which are positioned between the upper end of the cylinder and the head of the plunger, whereby the said helical springs will enter into action successively for increasing loads carried by the vehicle.

6. A suspension device mounted between a vehicle spring and a vehicle frame comprising a bracket mounted on the frame adjacent the end of the spring, parallel side plates pivotally connected to the bracket, a forked member pivotally connected to the end of the spring and having a headed stem projecting downwardly therefrom, a cylinder arranged about the stem and the plunger and to the upper end of which the lower ends of the plates are pivoted, the pivoted points of the bracket, the forked member and the cylinder being normally arranged in alignment with each other, and an elastic device arranged in the cylinder between the upper end thereof and the head of the plunger, substantially as and for the purposes set forth.

In testimony whereof he has signed this specification.

ANDRÉ BEURDELEY.